Figure 1:
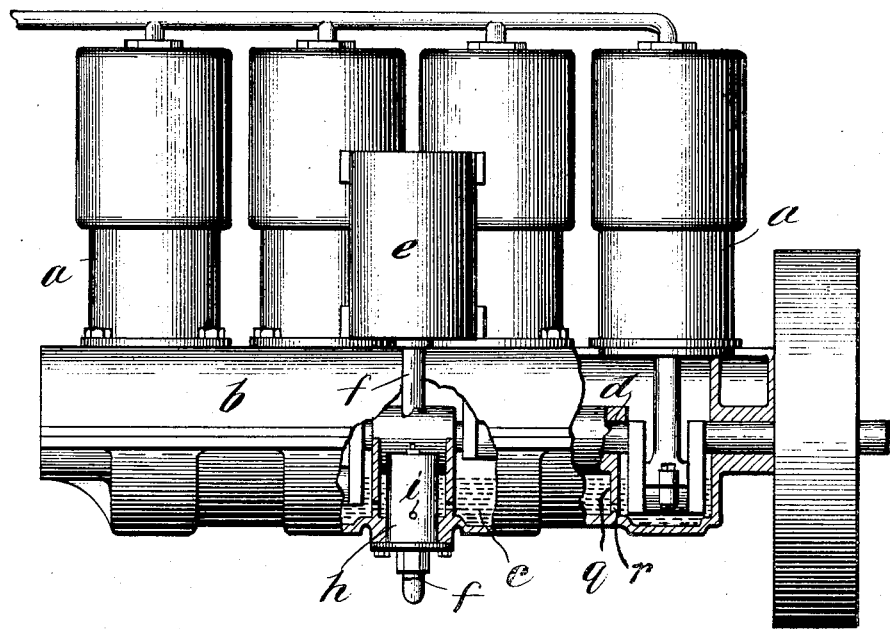

No. 889,339. PATENTED JUNE 2, 1908.
K. SHAFFER.
LUBRICATING APPARATUS.
APPLICATION FILED FEB. 1, 1908.

Witnesses:

Inventor:
Kent Shaffer,
By _____ Atty.

UNITED STATES PATENT OFFICE.

KENT SHAFFER, OF EVANSTON, ILLINOIS.

LUBRICATING APPARATUS.

No. 889,339.　　　　Specification of Letters Patent.　　　Patented June 2, 1908.

Application filed February 1, 1908. Serial No. 413,734.

*To all whom it may concern:*

Be it known that I, KENT SHAFFER, citizen of the United States, residing at Evanston, in the county of Cook and State of Illinois, (post-office address general delivery, Evanston, Illinois,) have invented a certain new and useful Improvement in Lubricating Apparatus, of which the following is a full, clear, concise, and exact description, reference being had to the accompanying drawings, forming a part of this specification.

My invention relates to machinery which is automatically lubricated, and finds a very important embodiment in connection with engines having crank cases containing lubricating oil which is agitated by cranks upon the crank shafts for the purpose of casting lubricating oil upon engine parts working within the crank cases and the engine cylinders communicating with the crank cases.

A very useful embodiment of my invention resides in the adaptation thereof to automobile engines, for by means of it the complicated, expensive and troublesome oilers now employed in connection with the crank cases of automobile engines may be dispensed with.

In practicing my invention, I employ a valve which is located in a passage leading from an oil reservoir or tank to the crank case, mechanism governed by the oil passed through the valve for governing the position of the valve, and guarding means for preventing the agitated oil within the crank case from interfering with the proper operation of said mechanism.

In the preferred embodiment of my invention, the valve opens by reason of the weight thereof and parts moving therewith, thereby to permit of the passage of oil from the oil reservoir into the crank case, the valve being shut through the agency of the oil admitted to the crank case, for which purpose a float desirably enters into the construction of the preferred embodiment of my invention, which float is adapted to be raised by the oil passed through the valve passage when oil in sufficient quantity has been received within the crank case. The guarding means which prevents the agitation of the oil in the crank case from interfering with the proper operation of the valve-closing mechanism, is preferably a chamber sufficiently sealed at its top portion to prevent the oil from disturbing the float which is contained within the chamber, the oil being initially supplied to said chamber through a valve passage located in the bottom of the chamber, the said chamber having communication with the crank case at a point below the normal level of the oil in the crank case. I speak of sufficiently sealing the top portion of the chamber to prevent the oil from finding access from the top portion to the interior of the chamber, because in the preferred embodiment of my invention, said chamber is located within the crank case, there being merely eduction ports in said chamber for leading the oil from the chamber to the crank case. However, it is obvious that my invention is not to be limited to the location of the said chamber within the crank case.

I will explain my invention more fully by reference to the accompanying drawing, showing the preferred embodiment thereof as employed in connection with automobile engines, in which—

Figure 2:
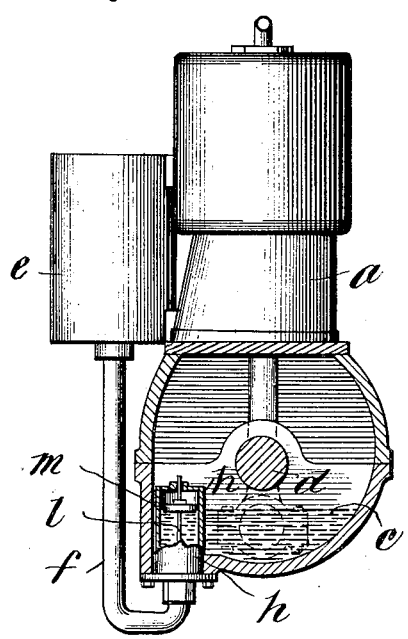
Figure 3:
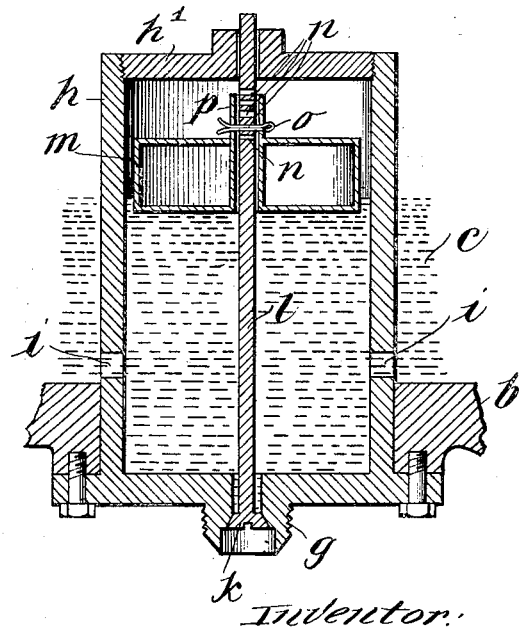

Figure 1 is a view in elevation, partially in section, of an engine equipped in accordance with my invention. Fig. 2 is a view at right-angles to the structure as shown in Fig. 1, parts being broken away and shown in section. Fig. 3 is an enlarged view of the chamber which enters into the apparatus shown in Figs. 1 and 2.

Like parts are indicated by similar characters of reference throughout the different figures.

I do not deem a description of the engine to be necessary to an understanding of my present invention, it being sufficient to state that the engine shown is a well-known type of engine adapted for use in automobiles and which is provided with a plurality of cylinders $a\ a$ in which pistons travel, and which cylinders communicate with a crank case $b$ which is common to all of the engine cylinders and which contains lubricating oil $c$ for the purpose of lubricating working parts of the engine within the crank case and within the cylinders communicating with the crank case. It is understood, of course, that parts move with the cranks upon the engine shaft $d$ to agitate the lubricating oil and cast the same upon the working parts within the crank case and cylinders.

Very complicated, expensive and troublesome mechanism has hitherto been employed for supplying lubricating oil to the crank cases of automobile engines, and for the purpose of maintaining the normal level or quantity of such oil within the crank cases.

In practicing my invention in connection with automobile engines, I employ a main reservoir $e$ for oil, from which a pipe $f$ extends to the bottom of the crank case and is there in threaded connection with a nipple $g$ whose opening constitutes a valve passage through which the oil under certain conditions may pass by force of gravity from the tank $e$. The nipple $g$ projects from the bottom wall of a chamber $h$ having eduction ports $i$ which are located materially below the normal level of the oil $c$ within the crank case, so that the oil within said chamber will not be agitated in harmony with the oil outside of the chamber and within the crank case, for reasons which will appear. A valve $k$ is located in the valve passage within the nipple $g$, a stem $l$ projecting upwardly from the valve and carrying at an upper portion thereof a float $m$ which is the preferred instrumentality acted upon by the oil that has passed the valve $k$ for governing the flow of oil through the passage of said valve. When a sufficient quantity of oil has been received within the crank case, the float $m$ rises sufficiently to close the valve $k$, thereby to cut off the further flow of oil from the oil tank $e$. When the quantity of oil within the crank case is below the predetermined quantity, the weight of the float, the valve and the valve stem causes an unseating of the valve $k$, whereby the flow of oil from the oil supply tank or reservoir $e$ is renewed.

In order that the apparatus of my invention may be adaptable to the use of different weights of lubricating oil, I make the float $m$ adjustable along the stem $l$, for which purpose said stem may have a series of holes $n$ drilled therethrough, through which holes a cotter-pin $o$ may be passed, this cotter-pin also passing through holes provided in a cylindrical extension $p$ of the float valve case.

For purposes of removability and accessibility, the top $h^1$ of the chamber $h$ is in screw-threaded engagement with the vertical portion of the chamber. The discharge passages $i$ are co-extensive with the thickness of the wall of the chamber $h$ when said chamber is located within the crank case. I do not wish to be limited to the length of the discharge passages $i$, nor to the location of the chamber within the crank case.

In automobile practice, partial partitions, such as $q$, are provided in the crank case, in which event I preferably provide passageways $r$ near the bottoms of the partitions to permit of the ready flow of oil into various parts of the crank case from the chamber $h$.

While I have herein shown and described the preferred form of my invention as embodied in an automobile engine, I do not wish to be limited to such embodiment of my invention.

It is obvious that changes may readily be made in the embodiment of my invention herein shown and particularly described without departing from the spirit of my invention.

Having thus described my invention, I claim as new and desire to secure by Letters Patent:—

1. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, the valve having a stem, said float being adjustable along the stem, and means for guarding the said mechanism against the agitation of the oil within the case, said means being in the form of a chamber located within the case into which the oil is led from the oil supply and from which the oil is discharged into the case, the place of discharge of the oil from the chamber to the case being disposed sufficiently away from the normal level of the oil within the case to prevent communication of the agitation of the oil within the case to the oil within the chamber.

2. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, and means for guarding the said mechanism against the agitation of the oil within the case, said means being in the form of a chamber located within the case into which the oil is led from the oil supply and from which the oil is discharged into the case, the place of discharge of the oil from the chamber to the case being disposed sufficiently away from the normal level of the oil within the case to prevent communication of the agitation of the oil within the case to the oil within the chamber.

3. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, mechanism controlled by the oil which has passed from said source of supply by the valve for controlling the operative position of the valve, and means for guarding the said mechanism against the agitation of the oil within the case, said means being in the form of a chamber located within the case into which the oil is led from the oil supply and from which the oil is discharged into the case, the place of discharge of the oil from the chamber to the case being disposed sufficiently away from the normal level of the oil within the case to prevent communication of the agitation of the oil within the case to the oil within the chamber.

4. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, the valve having a stem, said float being adjustable along the stem, and means for guarding the said mechanism against the agitation of the oil within the case, said means being in the form of a chamber into which the oil is led from the oil supply and from which the oil is discharged into the case, the place of discharge of the oil from the chamber to the case being disposed sufficiently away from the normal level of the oil within the case to prevent communication of the agitation of the oil within the case to the oil within the chamber.

5. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, and means for guarding the said mechanism against the agitation of the oil within the case, said means being in the form of a chamber into which the oil is led from the oil supply and from which the oil is discharged into the case, the place of discharge of the oil from the chamber to the case being disposed sufficiently away from the normal level of the oil within the case to prevent communication of the agitation of the oil within the case to the oil within the chamber.

6. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, mechanism controlled by the oil which has passed from said source of supply by the valve for controlling the operative position of the valve, and means for guarding the said mechanism against the agitation of the oil within the case, said means being in the form of a chamber into which the oil is led from the oil supply and from which the oil is discharged into the case, the place of discharge of the oil from the chamber to the case being disposed sufficiently away from the normal level of the oil within the case to prevent communication of the agitation of the oil within the case to the oil within the chamber.

7. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, the valve having a stem, said float being adjustable along the stem, and means for guarding the said mechanism against the agitation of the oil within the case, said means being in the form of a chamber into which the oil is led from the oil supply and from which the oil is discharged into the case.

8. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, and means for guarding the said mechanism against the agitation of the oil within the case, said means being in the form of a chamber into which the oil is led from the oil supply and from which the oil is discharged into the case.

9. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, mechanism controlled by the oil which has passed from said source of supply by the valve for controlling the operative position of the valve, and means for guarding the said mechanism against the agitation of the oil within the case, said means being in the form of a chamber into which the oil is led from the oil supply and from which the oil is discharged into the case.

10. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, the valve having a stem, said float being adjustable along the stem, and means for guarding the said mechanism against the agitation of the oil within the case.

11. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, float mechanism controlled by the oil which has passed from said source of supply by the valve for controlling the operative position of the valve, and means for guarding the said mechanism against the agitation of the oil within the case.

12. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, mechanism controlled by the oil which has passed from said source of supply by the valve for controlling the operative position of the valve, and means for guarding the said mechanism against the agitation of the oil within the case.

13. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, and float mechanism controlled by the oil which has passed from said source of supply by the valve for controlling the operative position of the valve, the valve having a stem, said float being adjustable along the stem.

14. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, and float mechanism controlled by the oil which has passed from said source of supply by the valve for controlling the operative position of the valve.

15. The combination with a case containing lubricating oil, of mechanism within the case to be lubricated by said oil and serving to agitate the oil to bring it into contact with working parts, a source of supply for the oil, there being a passage intervening between the source of supply and the case for the passage of oil to the case, a valve in said passage, and mechanism controlled by the oil which has passed from said source of supply by the valve for controlling the operative position of the valve.

In witness whereof, I hereunto subscribe my name this 27th day of January A. D., 1908.

KENT SHAFFER.

Witnesses:
G. L. CRAGG,
L. G. STROH.